Aug. 3, 1954     J. E. MECEY ET AL     2,685,471
RAINWATER DEFLECTOR FOR VEHICLE VENTILATOR WINDOWS
Filed Oct. 16, 1952
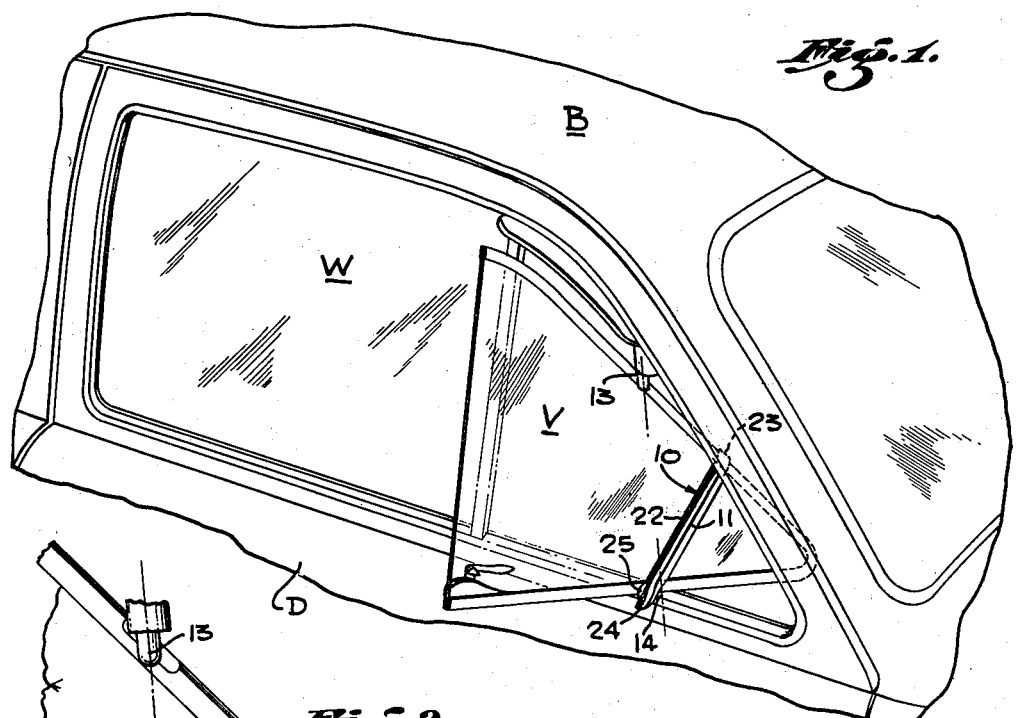
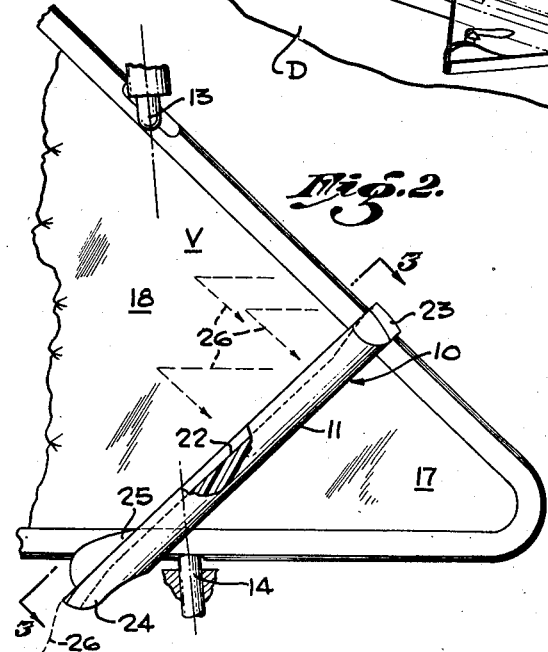
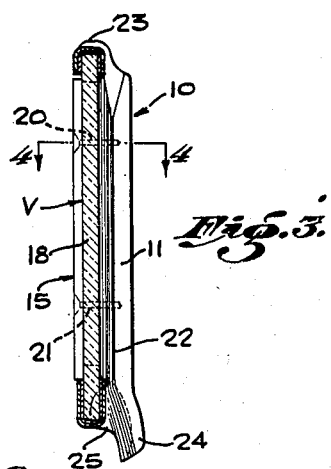
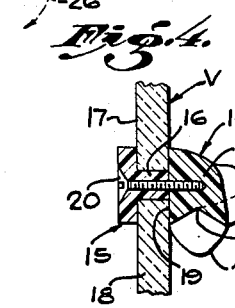
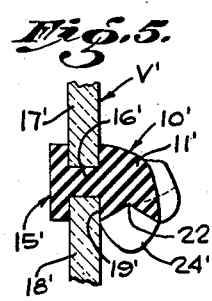
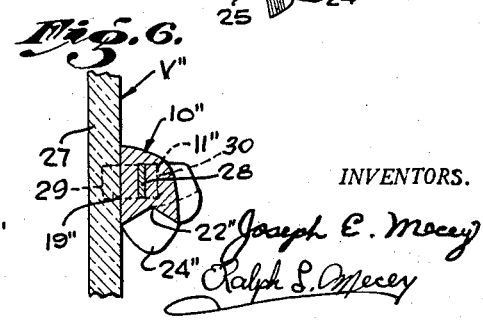
INVENTORS.

Patented Aug. 3, 1954

2,685,471

UNITED STATES PATENT OFFICE 2,685,471

RAINWATER DEFLECTOR FOR VEHICLE VENTILATOR WINDOWS

Joseph E. Mecey and Ralph L. Mecey, Burbank, Calif.

Application October 16, 1952, Serial No. 315,134

4 Claims. (Cl. 296—44)

1

This invention relates to automobile window ventilators and more particularly to the drainage of rainwater droplets from such ventilators.

The desirability of keeping the ventilator window open, to perform its normal function when the automobile is in use, is well recognized, but heretofore it has been impossible to maintain the ventilator in an open position when driving during rainy weather without a resultant diversion of rainwater inside the automobile.

The basic problem of preventing this diversion of rainwater droplets is well known in the prior art, however, prior devices have dealt with ventilators rotatable about a vertical or substantially vertical axis, and when opened, the front of the ventilator would not drop below the lower window sill of the window and enter the inside of the automobile. With the advent of streamlined body contours and inwardly sloping body sides, it has been found necessary to have a type of ventilator which revolves about an axis which is inclined substantially inwardly from the vertical, the inner portion of said ventilator dropping as it rotates and assuming a position within the automobile and below the level of the window sill.

Rainwater, striking the portion of the ventilator which extends outward from the body contour, runs down and along the ventilator glass and frame to the lowest point of the ventilator where it must, of necessity, drain off within the automobile. It thus becomes apparent that if the occupants and interior finish of the automobile are to be kept dry, the water must be diverted before it reaches any point within the automobile which is below the level of the window sill.

Thus an object of the invention is to provide a novel means to prevent rainwater droplets from draining from such a ventilator, into the automobile and onto the occupants or interior finish of the automobile.

Another object of the invention is to provide a novel device for preventing rainwater from reaching any point within the automobile which is below the level of the window sill.

A further object of the invention is to provide a novel means for diverting rainwater to a position where it will drain outside the automobile body.

A still further object of the invention is to provide a novel rainwater deflection device, for use in conjunction with an automobile ventilator, that is relatively simple in construction, efficient and reliable in use, attractive in appearance and economical in manufacture.

2

Other and further important objects and advantages of the invention will become apparent from the disclosures in the following description, appended claims and accompanying drawings wherein:

Fig. 1 is a perspective view of the upper portion of an automobile body and front door, showing the window ventilator of the present invention attached thereto;

Fig. 2 is a fragmentary side elevational view of the front portion of the window ventilator and deflector;

Fig. 3 is substantially a top plan view of the deflector of the present invention and taken substantially as indicated by line 3—3, Fig. 2;

Fig. 4 is a sectional view of the deflector of Fig. 3 taken substantially as indicated by line 4—4, Fig. 3;

Fig. 5 is a view similar to Fig. 4 showing a modified form of construction; and

Fig. 6 is also a view similar to Figs. 4 and 5, and showing a further modified form of construction.

Referring to the drawing by reference characters, the deflector 10 comprises an elongated body 11 which is adapted to extend intermediate and over the outer portions of the frame member, surrounding a window ventilator V. The ventilator V is of the standard type as employed with automobiles having inwardly inclined side body portions and utilized in conjunction with the standard window W in a door D, forming part of an automobile, indicated generally at B. The ventilator V is further provided with upper and lower hinge pivot points 13 and 14, as shown primarily in Figs. 1 and 2.

The body is secured to the ventilator V by means of a retaining member, indicated generally at 15. This retaining member has a substantially T shaped cross section with an inwardly directed rib section 16 which extends intermediate a pair of glass members 17 and 18, formed as part of the ventilator V. The outer extremity of the rib section 16 is adapted to be coextensive with the outer surface of the glass members 17 and 18 and is further adapted to be engaged by the inner surface 19 of the body portion 11, the two members 11 and 15 being secured one to the other by means of screws 20 and 21.

The position of the deflector 10 on the ventilator V, is such as to form an acute angle, with the axis of rotation about the hinge points 13 and 14 of the ventilator, this construction being shown primarily in Fig. 2. To enable conduction of the water droplets striking the portion 16 of the ventilator, we provide a substantially V-shaped groove 22 on the upperly and rearwardly directed surface of the body portion 11. The upper end of the groove 22 terminates at a position adjacent an inwardly turned lip 23 formed on the body portion and extends rearwardly and downwardly through an extension 24, of the body portion 11, the extension 24 extending to a point substantially below the lower portion of the frame of the ventilator V. The construction of the present device, at both ends thereof adjacent the frame of the ventilator, is such as to provide a substantially watertight contact therewith. To add to this seal, the lower end 24 is provided with an inwardly directed fillet 25 which is adapted to engage the lower outside portion of the ventilator frame, as shown in Fig. 3. The extension 24 is also arranged in such a manner as to extend the groove 22 outwardly from the plane of the ventilator window.

The body portion 11, and the retaining member 15, may be constructed from any suitable material such as for example wood, plastic, rubber, glass or metal and may be constructed by machining, casting, forging, molding, stamping or any other suitable means of construction.

In operation therefore, it may be seen that water droplets being forced against the portion 18 of the ventilator V will follow the approximate direction as indicated by the arrows 26 in Fig. 2, so that these droplets will be collected in the groove 22, conducted along the length of the body portion 11 and the extension 24, to be drained therefrom. The position of the extension 24, at a point to the rear of the axis of the lower hinge 14, is such as to enable conduction of this water to a point which is remote from the window sill and also outside the interior of the automobile body. Moisture is thus prevented from flowing to any point along the glass section 17 and therefrom into the interior of the automobile.

In practice, it has been found that water droplets, impinging upon the ventilators, tend to be directed toward the frame members surrounding the glass and drain inwardly and downwardly along these frame members so that ultimate disposition thereof will be within the automobile. To correct this situation the lip 23 and the fillet 25, associated with the body portion 11 and engaging the upper and lower portions of the ventilator frame member, intercept any flow along these frame members and force such a flow to be conducted either directly therefrom or, in a case of the upper member 23, into the groove 22 co-mingling with other water droplets therein to be conducted along said groove to the extension 24.

In Fig. 5 we show a modification of the present invention wherein like parts are indicated by single primed reference numerals. In this form, the body portion 11' and the retaining portion 15' are made integral with one another, the two portions being formed from relatively flexible material such as rubber or "Neoprene," for example, so that the T portion of the retainer 15' may be forced between a space provided intermediate the sections 17 and 18 of the glass. In some instances the construction may be such, and the rigidity of the portion 11' and 15' also such, that assembling of the device with the ventilator would entail either a suitable sealing compound or sealing strip be placed about the opposed edges of the glass portion 17' and 18'.

In Fig. 6 we show a further modification of the invention wherein like parts are indicated by double prime reference numerals. In this instance, the glass of the ventilator is indicated at 27 as a one piece section and the deflector 10 is secured to the outer surface of the glass 27 by any suitable means, such as for example, a spring member 28, which may be formed as by molding within the central longitudinal area of the body portion 11''. In this instance, it is proposed that the upper and lower ends of the spring 28 be formed into the material of the body portion 11'' in such a manner as to add rigidity to the ends thereof and extend as at 29 about the upper and lower surfaces of the frame surrounding the glass of the ventilator. The construction shown in Fig. 6 is particularly applicable for use in conjunction with ventilators on automobiles not equipped with such during manufacture. In order to provide for a solid contact along the surface of the glass 28, it is further proposed that the spring 28 be made convex as at 30 and as applied to the outer surface of the glass 27, such a construction insuring the complete contact of the body portion 11 along the surface of said glass. The construction of the spring 28 may also be such that it will engage the opposed edges of the frame member surrounding the glass so as to provide an expansion member intermediate these edges to rigidly retain the deflector 10 against the glass.

Having thus described the invention and the present embodiments thereof, it is desired to emphasize the fact that many different forms of construction may be resorted to and many different forms of material may be used in the construction of the device in a manner to be limited only by a just interpretation of the following claims.

We claim:

1. A rainwater deflector for use in conjunction with a vehicle window ventilator having upper and lower hinge pivot points defining an axis of rotation, a frame and a pair of glass members mounted in said frame in spaced relationship thereby to define opposed edges and a space therebetween comprising, in combination: an elongated body portion adapted to lie against a glass of said ventilator along a longitudinal axis whereby an acute angle is formed between said axis and the axis of rotation of said ventilator; a retaining member having a portion adapted to extend intermediate the edges of said pair of glass members and to engage said body member; means to secure said body portion to said retaining member; means adjacent the ends of said body portion for engaging the frame of said ventilator; a rearwardly directed longitudinal groove in said body portion; an extension on the lower end of said body portion; a continuation of said groove in said extension whereby moisture collected therein will be conducted to a point rearward and outward from the lower hinge pivot point of said ventilator.

2. A rainwater deflector for use in conjunction with a vehicle window ventilator having upper and lower hinge pivot points defining an axis of rotation, a frame and a pair of glass members mounted in said frame in spaced relationship thereby to define opposed edges and a space therebetween comprising, in combination: an elongated body portion adapted to lie against a glass of said ventilator along a longitudinal axis whereby an acute angle is formed between said axis and the axis of rotation of said ventilator; a retaining portion integral with the elongated body portion and adapted to extend intermediate the edges of said pair of glass members; means adjacent the ends of said body portion for engaging the frame of said ventilator; a rearwardly directed longitudinal groove in said body portion; an extension on the lower end of said body portion; a continuance of said groove in said extension whereby moisture collected therein will be conducted to a point rearward and outward from the lower hinge pivot point of said ventilator.

3. A rainwater deflector for use in conjunction with a vehicle window ventilator having upper and lower hinge pivot points defining an axis of rotation, a frame and a pair of glass members mounted in said frame in spaced relationship thereby to define opposed edges and a space therebetween comprising, in combination: an elongated body portion adapted to lie against a glass of said ventilator along a longitudinal axis whereby an acute angle is formed between said axis and the axis of rotation of said ventilator; a retaining member having a portion adapted to extend intermediate the edges of said pair of glass members and to engage said body member; means to secure said body portion to said retaining member; means adjacent the ends of said body portion for engaging the frame of said ventilator; a rearwardly directed longitudinal groove in said body portion; an extension on the lower end of said body portion; a continuation of said groove in said extension whereby moisture collected therein will be conducted to a point rearward and outward from the lower hinge pivot point of said ventilator; and a fillet formed on said body portion adjacent the lower end thereof and adapted for engagement with said ventilator frame for interrupting flow of rainwater along said frame and conducting said rainwater to said continuation of said groove.

4. A rainwater deflector for use in conjunction with a vehicle window ventilator having upper and lower hinge pivot points defining an axis of rotation, a frame and a pair of glass members mounted in said frame in spaced relationship thereby to define opposed edges and a space therebetween comprising, in combination: an elongated body portion adapted to lie against a glass of said ventilator along a longitudinal axis whereby an acute angle is formed between said axis and the axis of rotation of said ventilator; a T-shaped retaining member formed integrally with the elongated body portion and adapted to extend intermediate the edges of said pair of glass members; means adjacent the ends of said body portion for engaging the frame of said ventilator; a rearwardly directed longitudinal groove in said body portion; an extension on the lower end of said body portion; a continuation of said groove in said extension whereby moisture collected therein will be conducted to a point rearward and outward from the lower hinge pivot point of said ventilator; and a fillet formed on said body portion adjacent the lower end thereof and adapted for engagement with said ventilator frame for interrupting flow of rainwater along said frame and conducting said rainwater to said continuation of said groove.

References Cited in the file of this patent

UNITED STATES PATENTS

| Number | Name | Date |
|---|---|---|
| 1,495,727 | Cookingham | May 27, 1924 |
| 2,263,860 | Schell | Nov. 25, 1941 |
| 2,500,991 | Kent | Mar. 21, 1950 |
| 2,540,205 | Kent | Feb. 6, 1951 |
| 2,615,752 | Hoag | Oct. 28, 1952 |